US012634207B2

(12) United States Patent
Huggins et al.

(10) Patent No.: US 12,634,207 B2
(45) Date of Patent: May 19, 2026

(54) SYSTEMS AND METHODS FOR DYNAMICALLY GENERATING NOTIFICATIONS BASED ON CURRENT DATA TRANSMISSIONS OVER A REMOTE ELECTRONIC NETWORK

(71) Applicant: BANK OF AMERICA CORPORATION, Charlotte, NC (US)

(72) Inventors: Robert Nyeland Huggins, Charlotte, NC (US); George Anthony Albero, Charlotte, NC (US); Jinna Kim, Charlotte, NC (US); Kathleen Rae Hablutzel, Pittsboro, NC (US); Christopher Perez, Monroe, NC (US); Paul Martin Mattison, Sherrills Ford, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 45 days.

(21) Appl. No.: 18/731,853

(22) Filed: Jun. 3, 2024

(65) Prior Publication Data

US 2025/0373505 A1     Dec. 4, 2025

(51) Int. Cl.
| | |
|---|---|
| *G06F 15/16* | (2006.01) |
| *H04L 41/16* | (2022.01) |
| *H04L 41/22* | (2022.01) |

(52) U.S. Cl.
CPC .............. *H04L 41/16* (2013.01); *H04L 41/22* (2013.01)

(58) Field of Classification Search
CPC ..................................................... H04L 41/16
See application file for complete search history.

(56) References Cited

U.S. PATENT DOCUMENTS

| | | | |
|---|---|---|---|
| 6,356,933 | B2 | 3/2002 | Mitchell |
| 6,424,354 | B1 | 7/2002 | Matheny |
| 7,600,046 | B2 | 10/2009 | Whittle |
| 7,657,868 | B2 | 2/2010 | Shenfield |
| 7,895,566 | B2 | 2/2011 | Shenfield |
| 9,306,877 | B2 | 4/2016 | Thomas |
| 9,531,651 | B1 | 12/2016 | Cherubini |
| 10,229,374 | B2 | 3/2019 | Alexander |
| 10,268,359 | B2 | 4/2019 | Whittle |
| 10,805,413 | B2 | 10/2020 | Papakipos |

(Continued)

*Primary Examiner* — Padma Mundur

(74) *Attorney, Agent, or Firm* — Moore & Van Allen PLLC; Lauren M. Stokes

(57) ABSTRACT

Systems, computer program products, and methods are described herein for dynamically generating notifications based on current data transmissions over a remote electronic network. The present invention is configured to identify a communication channel comprising a user identifier; train a generative AI engine based on at least one pre-determined guardrail for the communication data in the communication channel, historical user data associated with the user identifier, and at least one issue attribute; collect real time data of the communication channel; apply the real time data to the trained generative AI engine; determine, by the generative AI engine, at least one issue attribute for the communication channel; generate, by the generative AI engine, a dynamic script based on the real time data and the at least one issue attribute; and generate a notification interface component based on the dynamic script.

20 Claims, 8 Drawing Sheets

(56) References Cited

U.S. PATENT DOCUMENTS

| | | | |
|---|---|---|---|
| 10,944,703 B2 | 3/2021 | Silva | |
| 11,057,486 B2 | 7/2021 | Modi | |
| 11,061,721 B2 | 7/2021 | Rimoni | |
| 11,399,721 B2 | 8/2022 | Mahalingam | |
| 11,741,819 B2 | 8/2023 | Katz | |
| 12,348,545 B1 * | 7/2025 | Parikh | H04L 63/1433 |
| 2003/0151621 A1 | 8/2003 | McEvilly | |
| 2005/0066018 A1 | 3/2005 | Whittle | |
| 2011/0314064 A1 | 12/2011 | Jeyaseelan | |
| 2020/0279567 A1 | 9/2020 | Adlersberg | |
| 2022/0012604 A1 * | 1/2022 | Mumma | G06Q 20/3227 |
| 2024/0104243 A1 | 3/2024 | Dods | |

* cited by examiner

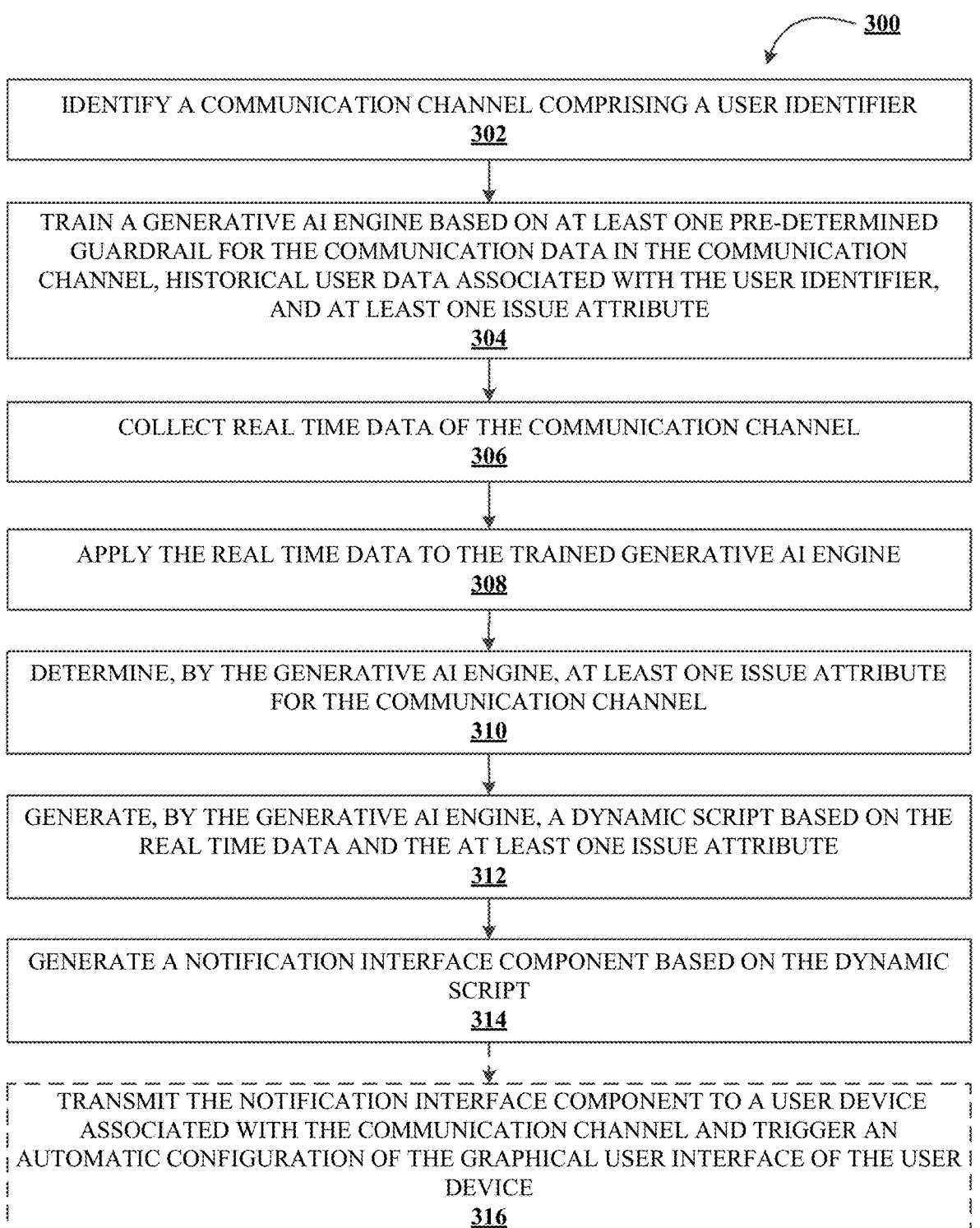

300

IDENTIFY A COMMUNICATION CHANNEL COMPRISING A USER IDENTIFIER
302

TRAIN A GENERATIVE AI ENGINE BASED ON AT LEAST ONE PRE-DETERMINED GUARDRAIL FOR THE COMMUNICATION DATA IN THE COMMUNICATION CHANNEL, HISTORICAL USER DATA ASSOCIATED WITH THE USER IDENTIFIER, AND AT LEAST ONE ISSUE ATTRIBUTE
304

COLLECT REAL TIME DATA OF THE COMMUNICATION CHANNEL
306

APPLY THE REAL TIME DATA TO THE TRAINED GENERATIVE AI ENGINE
308

DETERMINE, BY THE GENERATIVE AI ENGINE, AT LEAST ONE ISSUE ATTRIBUTE FOR THE COMMUNICATION CHANNEL
310

GENERATE, BY THE GENERATIVE AI ENGINE, A DYNAMIC SCRIPT BASED ON THE REAL TIME DATA AND THE AT LEAST ONE ISSUE ATTRIBUTE
312

GENERATE A NOTIFICATION INTERFACE COMPONENT BASED ON THE DYNAMIC SCRIPT
314

TRANSMIT THE NOTIFICATION INTERFACE COMPONENT TO A USER DEVICE ASSOCIATED WITH THE COMMUNICATION CHANNEL AND TRIGGER AN AUTOMATIC CONFIGURATION OF THE GRAPHICAL USER INTERFACE OF THE USER DEVICE
316

FIGURE 3

UPDATE THE DYNAMIC SCRIPT USING THE GENERATIVE AI ENGINE CONTINUOUSLY AND BASED ON COLLECTED REAL TIME DATA, WHEREIN THE COLLECTED REAL TIME DATA IS BASED ON A TRIGGER FOR EACH NEWLY COLLECTED REAL TIME DATA
402

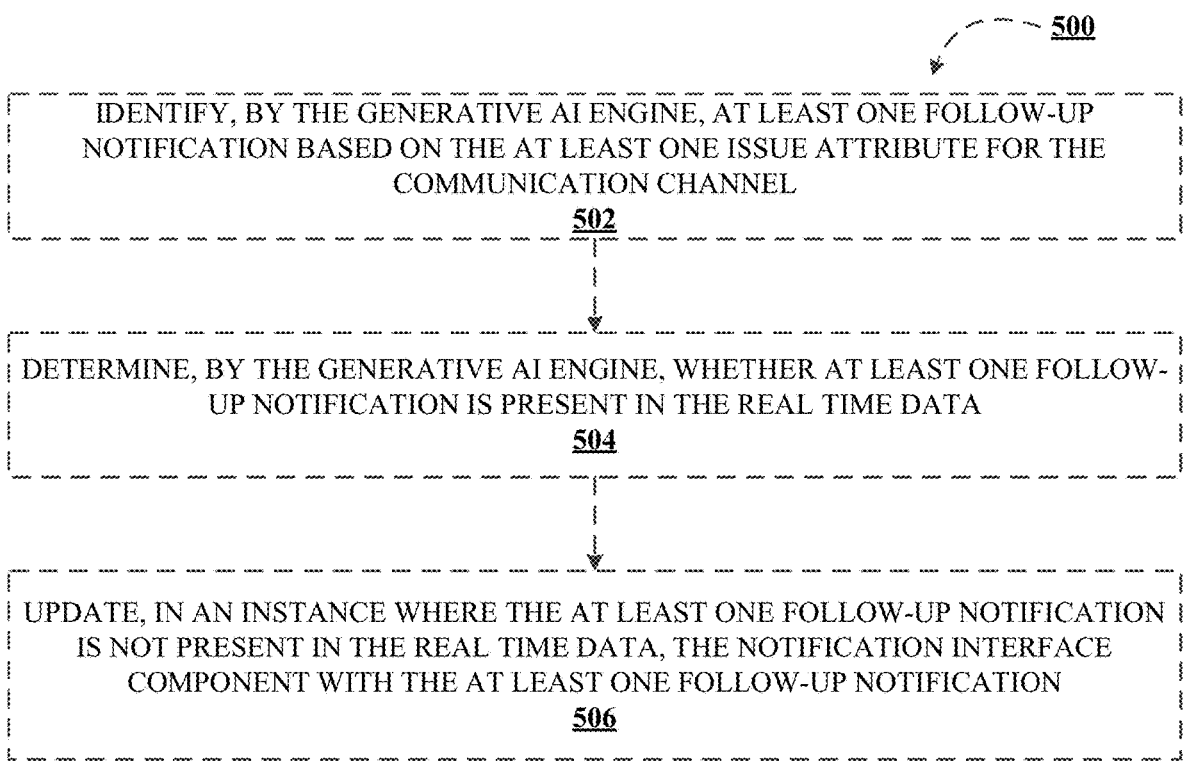

IDENTIFY, BY THE GENERATIVE AI ENGINE, AT LEAST ONE FOLLOW-UP NOTIFICATION BASED ON THE AT LEAST ONE ISSUE ATTRIBUTE FOR THE COMMUNICATION CHANNEL
502

DETERMINE, BY THE GENERATIVE AI ENGINE, WHETHER AT LEAST ONE FOLLOW-UP NOTIFICATION IS PRESENT IN THE REAL TIME DATA
504

UPDATE, IN AN INSTANCE WHERE THE AT LEAST ONE FOLLOW-UP NOTIFICATION IS NOT PRESENT IN THE REAL TIME DATA, THE NOTIFICATION INTERFACE COMPONENT WITH THE AT LEAST ONE FOLLOW-UP NOTIFICATION
506

FIGURE 5

SYSTEMS AND METHODS FOR DYNAMICALLY GENERATING NOTIFICATIONS BASED ON CURRENT DATA TRANSMISSIONS OVER A REMOTE ELECTRONIC NETWORK

FIELD OF THE INVENTION

The present invention embraces a system for dynamically generating notifications based on current data transmissions over a remote electronic network.

BACKGROUND

Issues often arise in remote electronic communications when particular guardrails or guidelines must be adhered to in the electronic communications, but where the electronic communications are hard to record and decipher in real time in order to determine whether the guardrails or guidelines have been disregarded. Further, notifications or alerts may likewise be difficult to generate in real time to avoid such disregard of these guidelines, such that the alerts are generated and configured on user device graphical user interfaces in real time and dynamically. Thus, a system for dynamically, automatically, and in real time generating notifications based on current data transmissions over remote electronic communications is needed.

Applicant has identified a number of deficiencies and problems associated with generating notifications dynamically for current data transmissions. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamically generating notifications based on current data transmissions over a remote electronic network is provided. In some embodiments, the system may comprise: a processing device; a non-transitory storage device containing instructions when executed by the processing device, causes the processing device to perform the steps of: identify a communication channel comprising a user identifier; train a generative AI engine based on at least one pre-determined guardrail for the communication data in the communication channel, historical user data associated with the user identifier, and at least one issue attribute; collect real time data of the communication channel; apply the real time data to the trained generative AI engine; determine, by the generative AI engine, at least one issue attribute for the communication channel; generate, by the generative AI engine, a dynamic script based on the real time data and the at least one issue attribute; and generate a notification interface component based on the dynamic script.

In some embodiments, the non-transitory storage device containing instructions when executed by the processing device, causes the processing device to perform the steps of transmitting the notification interface component to a user device associated with the communication channel and trigger an automatic configuration of the graphical user interface of the user device. In some embodiments, the user device is associated with an agent identifier.

In some embodiments, the non-transitory storage device containing instructions when executed by the processing device, causes the processing device to perform the steps of updating the dynamic script using the generative AI engine continuously and based on collected real time data, wherein the collected real time data is based on a trigger for each newly collected real time data.

In some embodiments, the real time data is compared to the at least one guardrail, and wherein the generative AI engine generates the notification interface component comprising a guardrail alert in an instance where the real time data is outside of the at least one guardrail.

In some embodiments, the generative AI engine is further trained with a database comprising a plurality of pre-generated scripts or a dataset of communication trait attributes associated with the user identifier.

In some embodiments, the non-transitory storage device containing instructions when executed by the processing device, causes the processing device to perform the steps of: identifying, by the generative AI engine, at least one follow-up notification based on the at least one issue attribute for the communication channel; determining, by the generative AI engine, whether at least one follow-up notification is present in the real time data; and updating, in an instance where the at least one follow-up notification is not present in the real time data, the notification interface component with the at least one follow-up notification.

In some embodiments, the non-transitory storage device containing instructions when executed by the processing device, causes the processing device to perform the steps of: accessing, by the generative AI engine, an agent database associated with an entity of the communication channel; identifying, by the generative AI engine, at least one agent identifier from the agent database based on the at least one issue attribute of the communication channel compared to an agent issue attribute of the at least one agent identifier, wherein the issue attribute and the agent issue attribute match; and automatically transmitting the communication channel to an agent user device associated with the agent identifier.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
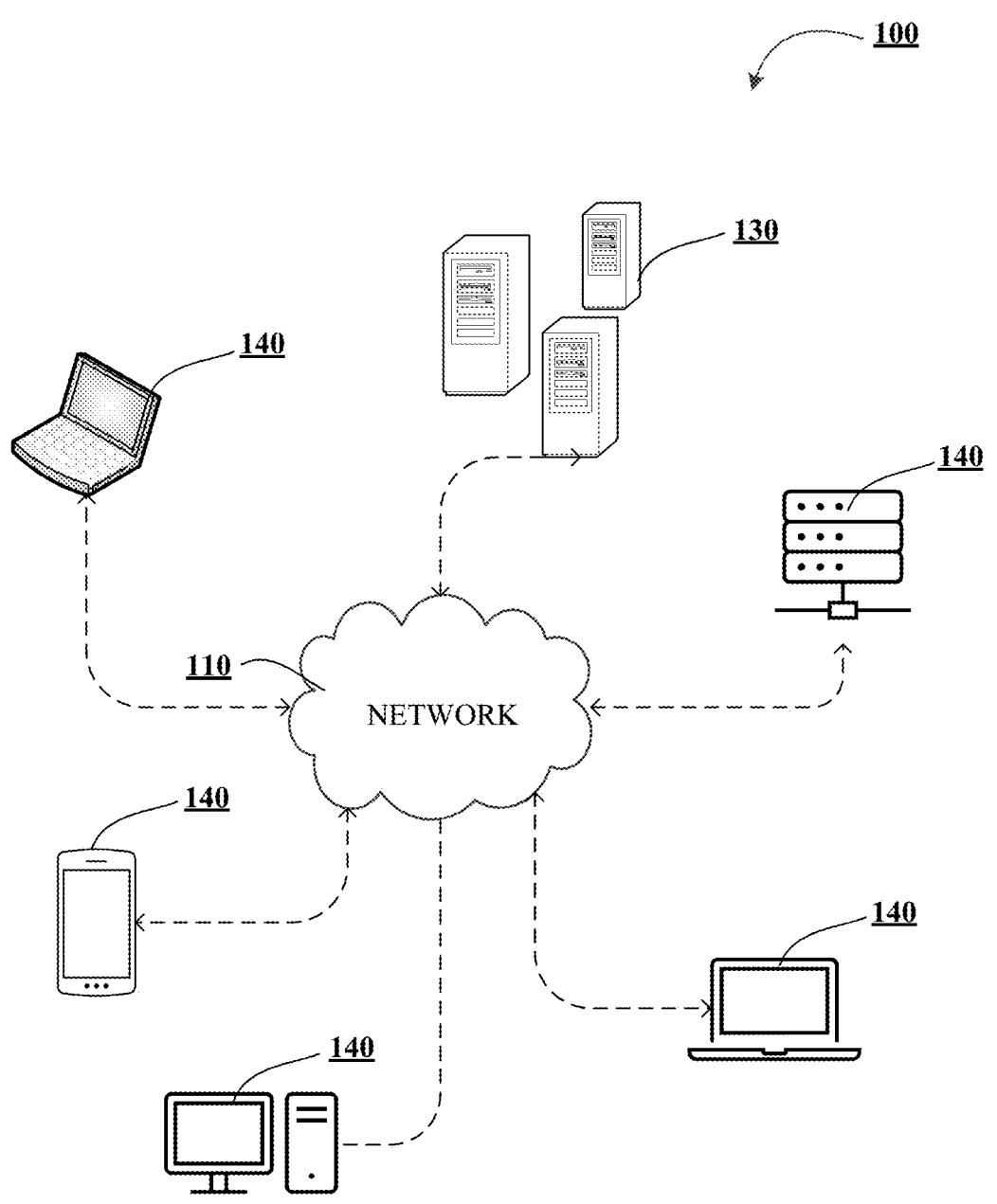
Figure 1B:
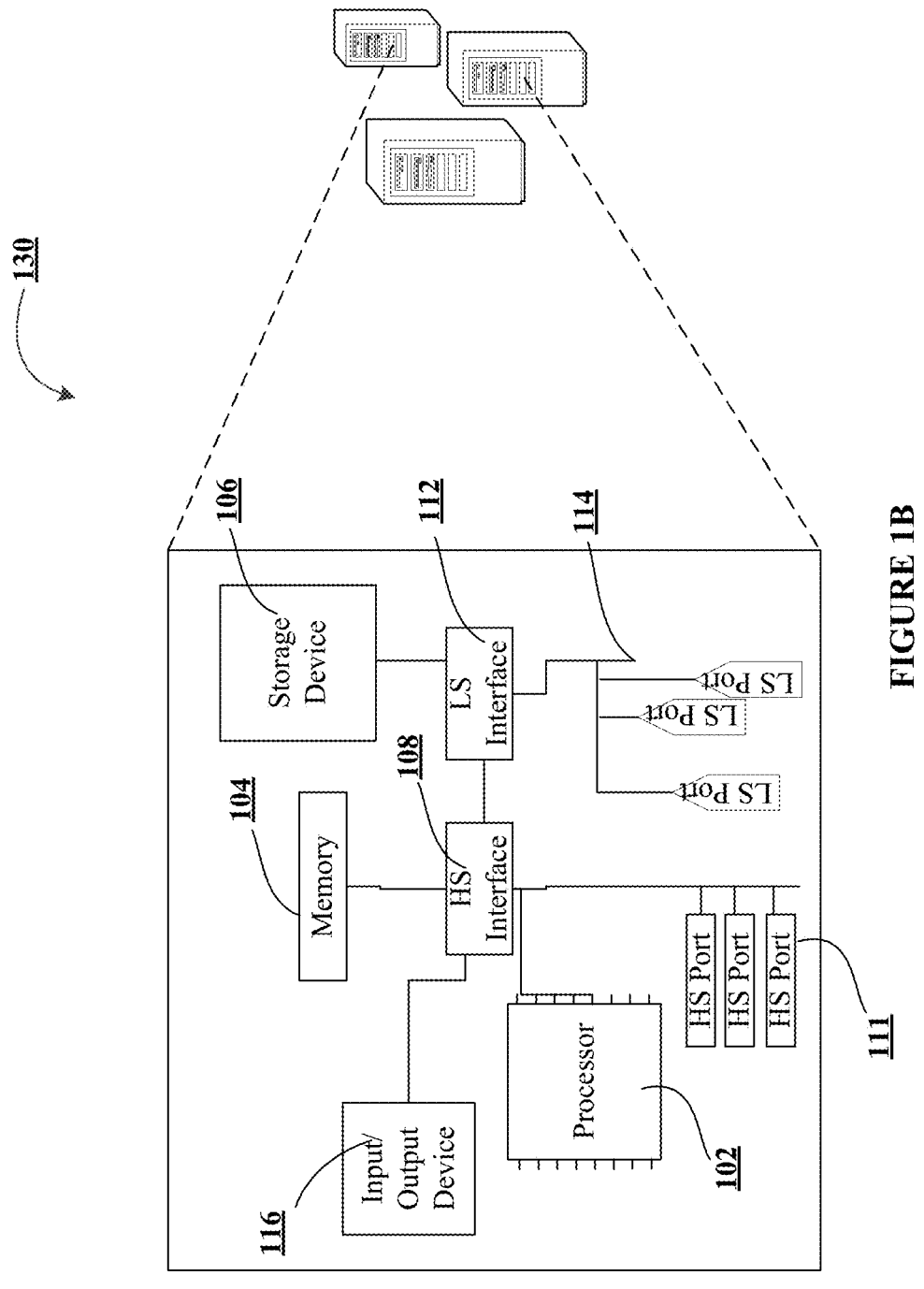
Figure 1C:
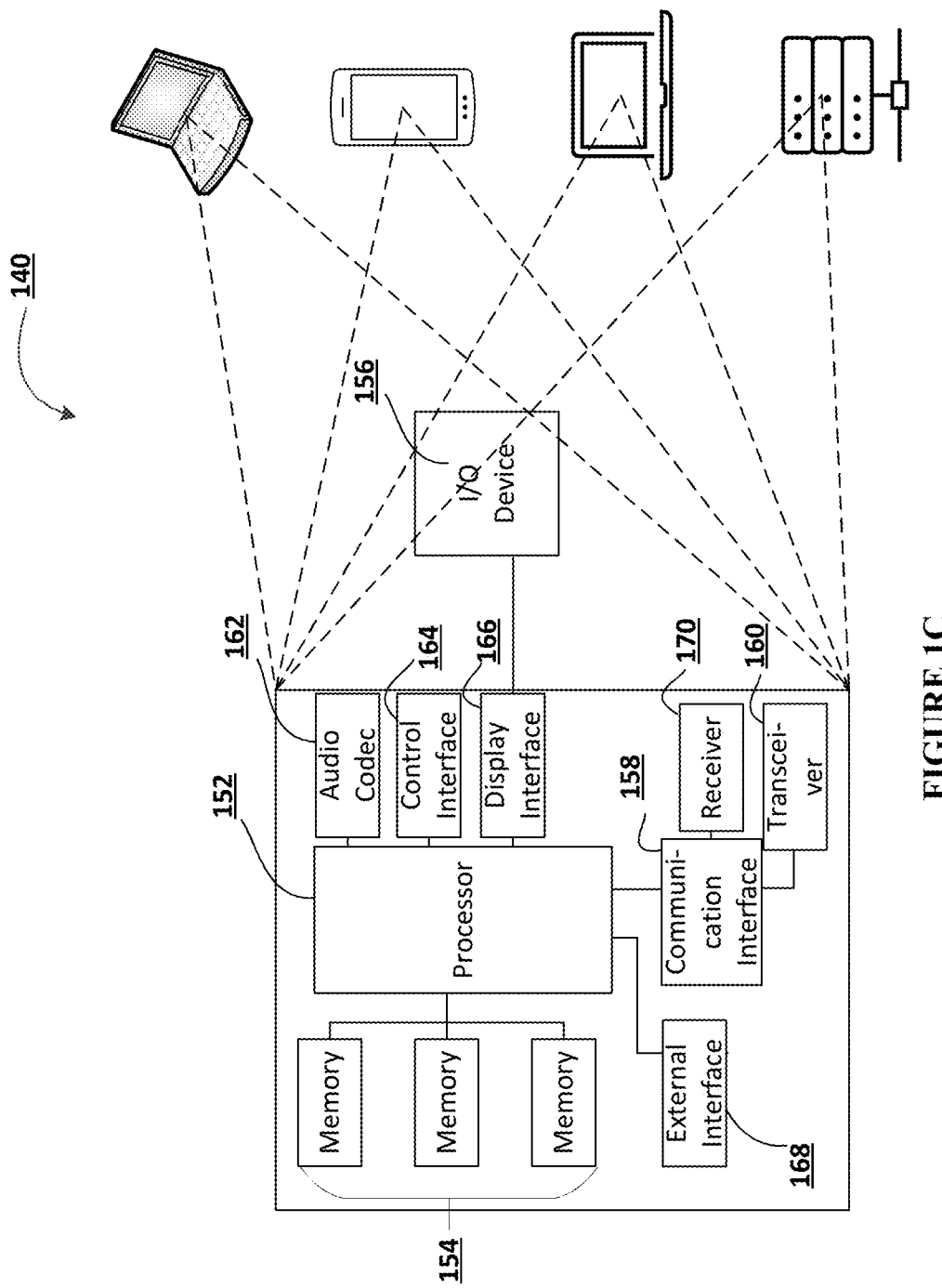
Figure 2:
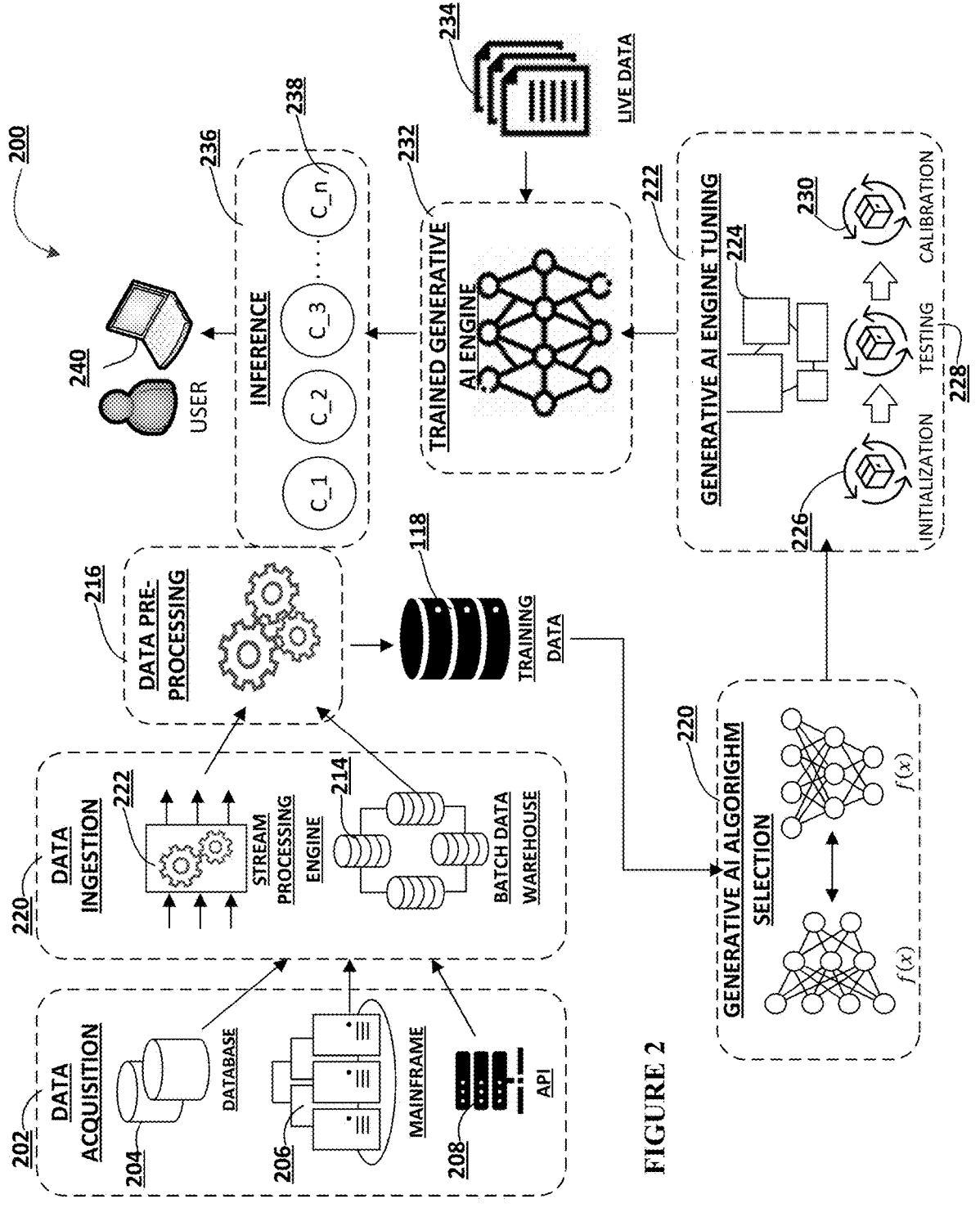
Figure 4:
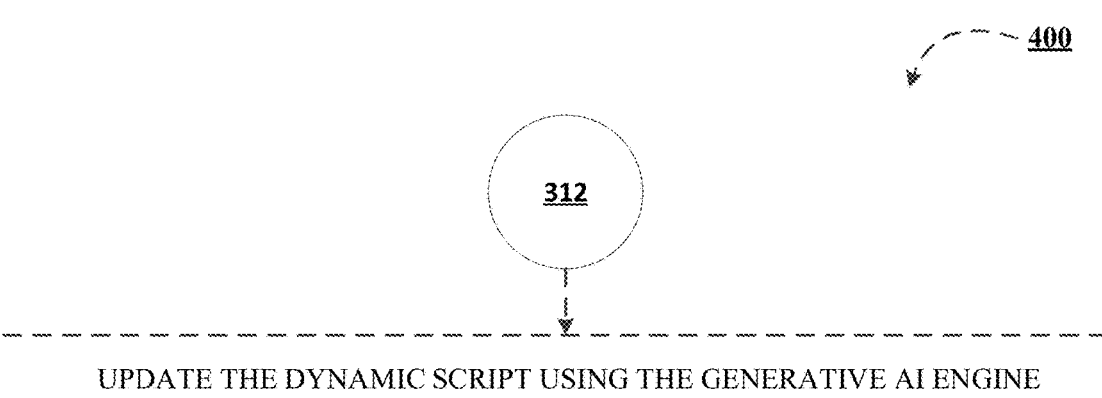
Figure 6:
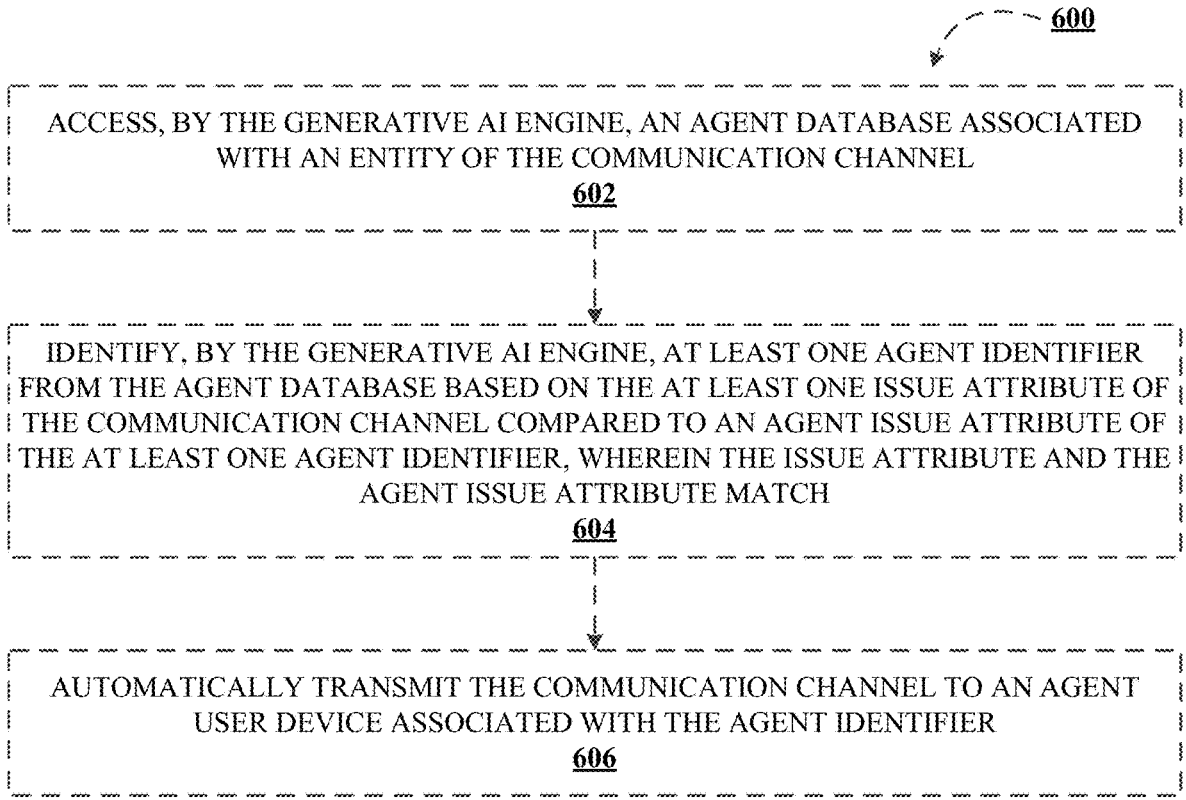

Having thus described embodiments of the invention in general terms, reference will now be made the accompanying drawings, wherein:

FIGS. 1A-1C illustrates technical components of an exemplary distributed computing environment for dynamically generating notifications based on current data transmissions over a remote electronic network, in accordance with an embodiment of the disclosure;

FIG. 2 illustrates an exemplary generative artificial intelligence (AI) engine subsystem architecture, in accordance with an embodiment of the disclosure;

FIG. 3 illustrates a process flow for dynamically generating notifications based on current data transmissions over a remote electronic network, in accordance with an embodiment of the disclosure;

FIG. 4 illustrates a process flow for updating the dynamic script using the generative AI engine based on collected real time data, in accordance with an embodiment of the disclosure;

FIG. 5 illustrates a process flow for updating the notification interface component with a follow-up notification, in accordance with an embodiment of the disclosure; and FIG. 6 illustrates a process flow for automatically transmitting the communication channel to an agent user device based on an identification of an agent identifier based on the issue attribute of the communication channel, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

Issues often arise in remote electronic communications when particular guardrails or guidelines must be adhered to in the electronic communications, but where the electronic communications are hard to record and decipher in real time in order to determine whether the guardrails or guidelines have been disregarded. Further, notifications or alerts may likewise be difficult to generate in real time to avoid such disregard of these guidelines, such that the alerts are generated and configured on user device graphical user interfaces in real time and dynamically. Thus, a system for dynamically, automatically, and in real time generating notifications based on current data transmissions over remote electronic communications is needed.

Accordingly, the present disclosure provides for the identification of a communication channel comprising a user identifier; the training of a generative AI engine based on at least one pre-determined guardrail for the communication data in the communication channel, historical user data associated with the user identifier, and at least one issue attribute; the collection of real time data of the communication channel; and the application of the real time data to the trained generative AI engine. Further, the present disclosure may provide for the determination, by the generative AI engine, of at least one issue attribute for the communication channel; the generation, by the generative AI engine, of a dynamic script based on the real time data and the at least one issue attribute; and the generation a notification interface component based on the dynamic script.

In other words, the disclosure comprises a system that is configured to generate notifications or pop-ups within a user device's graphical user interface (such as an agent's user device), which comprises a dynamic and automatic script based on current and previous electronic communications between the agent (or between other agents associated with a same entity) and a user and further based on pre-defined guardrails of what is acceptable (such as standards, rules, and/or the like). Additionally, the disclosure may provide the training of a generative AI engine-which is configured to generate the dynamic script-based on user preference data to customize the script to each user. In some embodiments, the system may generate an overview or index of each user with their historical data and their communication traits, which may then be used to train the AI engine for each particular user. Additionally, and based on such data regarding the user, the AI engine may determine which background data/external data is most important for the current issue faced by the user to collect the data necessary to make the best decision for helping the user.

What is more, the present invention provides a technical solution to a technical problem. As described herein, the technical problem includes generating notifications dynamically for current data transmissions. The technical solution presented herein allows for the dynamic and automatic generation of dynamic scripts based on real time communication data and the generation of notifications comprising such dynamic scripts to automatically configure a GUI of a user device. In particular, the disclosure is an improvement over existing solutions to the analysis and handling of current communication data transmissions, (i) with fewer steps to achieve the solution, thus reducing the amount of computing resources, such as processing resources, storage resources, network resources, and/or the like, that are being used (e.g., such as by using a trained generative AI engine to track current communication data in real time, generate dynamic scripts, and trigger configurations of GUIs with notifications comprising the dynamic scripts continuously until an issue is resolved, whereby such a generative AI engine may be trained using a central database of multiple datasets comprising user data, agent data, historical issue attributes, guardrails, and/or the like); (ii) providing a more accurate solution to problem, thus reducing the number of resources required to remedy any errors made due to a less accurate solution (e.g., by using a trained generative AI engine, less erroneous notifications and scripts are generated and less human error in generating their own scripts outside the guardrails occur); (iii) removing manual input and waste from the implementation of the solution, thus improving speed and efficiency of the process and conserving computing resources (e.g., by training a generative AI engine, which may further be trained with feedback data whenever the notification interface components are generated and the next real time data is analyzed); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing AI to generate a time-sensitive notifications related to configuration of GUIs 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single net work segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary generative artificial intelligence (AI) engine subsystem architecture 200, in accordance with an embodiment of the disclosure. The generative artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the generative artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources

204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In generative artificial intelligence, the quality of data and the useful information that can be derived therefrom directly affects the ability of the generative artificial intelligence engine 224 to learn. The data pre-processing engine 216 may implement advanced integration and processing steps needed to prepare the data for generative artificial intelligence training and execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, determining-via large language models-natural language data such as translating language in the data, summarizing text data, recognizing objects and text in images, predicting language data, assimilate data and information, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm or model being used, this training data 218 may require further enrichment. For example, in supervised learning, the training data is enriched using one or more meaningful and informative labels to provide context so a generative artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The generative AI tuning engine 222 may be used to train a generative artificial intelligence engine 224 using the training data 218 to make predictions or decisions without explicitly being programmed to do so. The generative artificial intelligence engine 224 represents what was learned by the selected artificial intelligence algorithm (or model) 220 and represents the rules, numbers, and any other algorithm-specific data structures required for classification. Selecting the right generative artificial intelligence algorithm may depend on a number of different factors, such as the problem statement and the kind of output needed, type and size of the data, the available computational time, number of features and observations in the data, and/or the like. Generative artificial intelligence algorithms may refer to programs (math and logic) that are configured to self-adjust and perform better as they are exposed to more data, including generating new data and datasets from feedback of previous outputs, greater data ingestion, and/or the like. To this extent, generative artificial intelligence algorithms are capable of adjusting their own parameters, given feedback on previous performance in making prediction about a dataset, generating new data, understanding language within the datasets, and/or the like.

The generative artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of generative artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the generative AI tuning engine 222 may repeatedly execute cycles of experimentation 226, testing 228, and tuning 230 to optimize the performance of the artificial intelligence algorithm 220 and refine the results in preparation for deployment of those results for consumption or decision making, and for receiving feedback via a supervised learning approach. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained generative artificial intelligence engine 232, similar to any other software application output, can be persisted to storage, file, memory, or application, or looped back into the processing component to be reprocessed. More often, the trained generative artificial intelligence engine 232 is deployed into an existing production environment to make practical business decisions based on live data 234. To this end, the generative artificial intelligence subsystem 200 uses the inference engine 236 to make such decisions. The type of decision-making may depend upon the type of generative artificial intelligence algorithm used. For example, generative artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, generate new data, and/or the like. On the other hand, generative artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, generative artificial intelligence engines that perform regression techniques may use live data 234 to predict or forecast continuous outcomes.

It will be understood that the embodiment of the generative artificial intelligence subsystem 200 illustrated in FIG. 2 is exemplary and that other embodiments may vary. As another example, in some embodiments, the generative artificial intelligence subsystem 200 may include more, fewer, or different components.

FIG. 3 illustrates a process flow 500 for dynamically generating notifications based on current data transmissions over a remote electronic network, in accordance with an embodiment of the disclosure. In some embodiments, a system (e.g., similar to one or more of the systems described herein with respect to FIGS. 1A-1C) may perform one or more of the steps of process flow 300. In some embodiments, a generative artificial intelligence engine (e.g., such as the generative AI engine shown in FIG. 2) may perform some or all the steps described in process flow 300.

As shown in block 302, the process flow 300 may include the step of process flow 300 may include the step of identifying a communication channel comprising a user identifier. For example, the system may identify a communication channel based on an identification of at least one electronic communication transmitted over a network, such as a phone call, an email correspondence, an instant messaging correspondence, a text message correspondence, and/or the like. In some embodiments, the communication channel identified may be separated from historical or past communication channels between a user and their user identifier and another entity (and/or an agent of the entity) based on a lapse in communications between the user and an agent of the entity for a pre-defined time (such as 24 hours, two days, three days, four days, a week, a month, and/or the like). Thus, and in some embodiments, the instant communication channel may comprise multiple communication transmissions with short periods of non-communication (e.g., periods of non-communication between text messages, email messages, instant messages, and/or the like). Further, and as ushed herein, the communication channel may further comprise at least one user identifier for at least one side of the communication channel, such as the side opposite of the entity and/or the entity's agent. In this manner, the communication channel may comprise communication transmission between the user associated with the user identifier and an agent identifier associated with an entity.

Additionally, and as used herein, the communication channel may comprise communication data which may be identified and collected in real time, which in turn is referred to as the real time data herein.

As shown in block 304, the process flow 300 may include the step of training a generative AI engine based on at least one pre-determined guardrail for the communication data in the communication channel, historical user data associated with the user identifier, and at least one issue attribute. For example, the system may train a generative AI engine (such as that shown in FIG. 2) with a plurality of datasets, such as but not limited to at least one pre-determined guardrail, historical user data associated with at least one user identifier, and/or at least one issue attribute. Each of these datasets may be collected and applied to the generative AI engine from a respective database (such as a central database comprising all these datasets, and/or a database specific to each dataset). For example, and in some embodiments, a user account database may comprise historical user account data, user data (such as historical issue attributes associated with a user identifier, historical communication trait attributes associated with a user identifier, user device identifiers associated with a user identifier, and/or the like), a guardrail database, and/or the like. As used herein, the historical communication trait attribute(s) refers to a communication trait of a user, such as the user's likelihood to listen to instructions, a user's likelihood to empathize, a user's likelihood to understand technology, a user's likelihood to be clear and concise in communication transmissions, and/or the like.

In some such embodiments, the generative AI engine may be trained by applying each of these datasets iteratively and as real time data of past or historical communication data is captured, outputs are generated, feedback received, and/or the like.

In some embodiments, the feedback may be received based on the generative AI engine generating at least one request to the user which is specific to the communication channel and overall communication transmissions in the current communication channel. Thus, and at the end of the current communication channel (which may be based on a real time data comprising an end term such as "thank you," "goodbye," and/or the like, or based on a pre-determined threshold of time that has passed between communication transmissions), the generative AI engine may generate a survey and/or a plurality of requests for the user side to interact with to generate feedback for the generative AI engine. Additionally, and in some such embodiments, the generative AI engine may generate the survey and/or plurality of requests based on the real time data, the issue attribute(s) identified, and the output generated, such that the survey and/or plurality of requests are customized to the communication channel. In this manner, the generative AI engine may generate its own feedback prompts to specifically train itself on the specific communication channel and its solution(s) generated.

As shown in block 306, the process flow 300 may include the step of collecting real time data of the communication channel. For example, and as used herein, the trained generative AI engine may be trained on both historical data and current real time data of the communication channel, which may further comprise a real time data that is used by the generative AI engine to determine at least one issue attribute for the communication channel. For instance, and as used herein, the issue attribute refers to at least one issue or problem faced by a user of the user identifier and the purpose of the communication channel generated between the user and an entity (or an entity's agent), such as a problem with the user's account, the user's authentication credentials, the user's resource account(s), and/or the like. Thus, and based on the real time data collected and analyzed by the generative AI engine, the generative AI engine may determine at least one issue attribute for the current communication channel and its transmissions.

Therefore, the system may be configured to collect all the real time data of the communication channel as the communication transmissions are transmitted over a network and/or as the communication transmissions are received and/or transmitted from one side of the communication channel (such as a user side or an entity side, where the system may be stored and/or operated).

As shown in block 308, the process flow 300 may include the step of applying the real time data to the trained generative AI engine. For instance, the system may apply the real time data to the generative AI engine, such that the generative AI engine may generate at least one determination (such as a determination or identification of any issue attributes in the communication channel) and/or generate a dynamic script (based on the identified issue attribute(s)). In this manner, the generative AI engine and its output is based on the collected real time data as it occurs within the communication channel and based on historical data of the user and of acceptable guardrails which the generative AI engine cannot go beyond in generating its output. As used herein, the pre-determined guardrails which are used for training the generative AI engine may comprise pre-defined rules for the scripts used by the entity and/or its agents, pre-defined templates for communication by the entity and/or its agents, standards for communication, and/or the like.

As shown in block 310, the process flow 300 may include the step of determining, by the generative AI engine, at least one issue attribute for the communication channel. For instance, the system may use the generative AI engine to analyze the real time data of the current communication channel and determine, based on the communication transmissions, at least one issue requested to be resolved by a user of the communication channel. Based on this determination, the system—using the generative AI engine—may further determine at least one guardrail applicable to the issue(s), previous script(s) used for resolving the issue or a similar issue, and/or the like, and may generate—using the generative AI engine—generate a dynamic script to resolve the at least one issue of the issue attribute(s).

Additionally, and in some embodiments, the at least one issue attribute may be determined based on both the real time data and on historical real time data of past communication channels associated with the user identifier and/or other user identifiers. Further, and in order to generate up to date dynamic scripts, the system may further update or determine the issue attribute based on each real time data collected during the instant communication channel on a continuous basis.

As shown in block 312, the process flow 300 may include the step of generating, by the generative AI engine, a dynamic script based on the real time data and the at least one issue attribute. For example, the system may generate the dynamic script for the instant communication channel, which may be based on the real time data, the identified issue attributes, the pre-defined guardrails, and/or the like. As used herein, the dynamic script refers to a file of text data which may be readable and understandable to a human reader (such as an agent of an entity) and may comprise suggestions in the form of text data to be read from by an entity's agent. In some embodiments, the pre-determined guardrails which are used to generate the dynamic script may comprise non-compliant terms, phrases, and/or the like, which cannot be used in the text data of the dynamic script.

As shown in block 314, the process flow 300 may include the step of generating a notification interface component based on the dynamic script. For instance, the system may generate a notification interface component, which is generated and transmitted to at least one user device to configure a graphical user interface (GUI) of the at least one user device. Thus, and as used herein, the notification interface component may comprise the data of the dynamic script in a file that can be transmitted over a network to a user device and then used to automatically configure a GUI of the receiving user device to show the text data of the script file in a human-readable format.

In some embodiments, the real time data is compared to the at least one guardrail, and wherein the generative AI engine generates the notification interface component comprising a guardrail alert in an instance where the real time data is outside of the at least one guardrail. Additionally, and in some such embodiments, the system may generate notifications and/or alerts which may be comprised within the notification interface component in an instance where the real time data captured matches one of the pre-determined guardrails, which may indicate that a communication transmission (e.g., from a user device and/or from a user device associated with an agent of the entity) has been used to generate a communication transmission comprising an impermissible topic, term, phrase, and/or the like, found in at least one of the pre-determined guardrails. In such embodiments, the notification interface component may comprise a guardrail alert which alerts the user of the user device (e.g., a user device associated with a user of the communication channel or a user device associated with an entity's agent), and which may indicate to the user of the user device (e.g., an agent of the entity) that the topic, phrase, term, and/or the like should be avoided and/or redacted.

In some embodiments, and as shown in block 316, the process flow 300 may include the step of transmitting the notification interface component to a user device associated with the communication channel and trigger an automatic configuration of the graphical user interface (GUI) of the user device. For instance, and in some embodiments, the system may transmit the data packet of the notification interface component to a user device and trigger an automatic configuration of a GUI of the user device to show the data of the notification interface component. Additionally, and in some embodiments, the user device that may receive the notification interface component may be associated with an agent identifier, such as a particular agent identifier which is adept or appropriate to handle the issue of the identified issue attribute(s). Such an embodiment for identifying an appropriate agent is described in further detail herein with respect to FIG. 6.

FIG. 4 illustrates a process flow 400 for updating the dynamic script using the generative AI engine based on collected real time data, in accordance with an embodiment of the disclosure. In some embodiments, a system (e.g., similar to one or more of the systems described herein with respect to FIGS. 1A-1C) may perform one or more of the steps of process flow 400. In some embodiments, a generative artificial intelligence engine (e.g., such as the generative AI engine shown in FIG. 2) may perform some or all the steps described in process flow 400.

In some embodiments, and as shown in block 402, the process flow 400 may include the step of updating the dynamic script using the generative AI engine continuously and based on collected real time data, wherein the collected real time data is based on a trigger for each newly collected real time data. For instance, and in some embodiments, the system may continuously and in real time update the dynamic script using the generative AI engine based one each piece of real time data collected and analyzed in the communication channel, such that the dynamic script may continuously be updated and refined for the purpose of the communication channel as the communication transmissions continue. In this manner, the dynamic script may be continuously refined and updated as the real time data is captured, even in an instance where a new issue attribute is identified in the communication channel, then the dynamic scrip may likewise be updated accordingly and in real time or near real time.

In some embodiments, and as shown in process flow 400, the process described herein with respect to block 402 may occur continuously and after the process described hereinabove with respect to block 312.

FIG. 5 illustrates a process flow 500 for updating the notification interface component with a follow-up notification, in accordance with an embodiment of the disclosure. In some embodiments, a system (e.g., similar to one or more of the systems described herein with respect to FIGS. 1A-1C) may perform one or more of the steps of process flow 500. In some embodiments, a generative artificial intelligence engine (e.g., such as the generative AI engine shown in FIG. 2) may perform some or all of the steps described in process flow 500.

In some embodiments, and as shown in block 502, the process flow 500 may include the step of identifying, by the generative AI engine, at least one follow-up notification based on the at least one issue attribute for the communication channel. For instance, and in some embodiments, the system may identify-using the generative AI engine-a follow-up notification(s) based on the real time data of the communication channel and based on is needed to resolve the issue of the identified issue attribute(s). In this manner, and by way of example, the follow-up notification may comprise at least one follow-up question and/or request to the user from the entity's agent's user device in order to resolve the issue of the at least one issue attribute.

In some embodiments, and as shown in block 504, the process flow 500 may include the step of determining, by the generative AI engine, whether at least one follow-up notification is present in the real time data. Thus, and in some such embodiments, the at least one follow-up notification may be dynamically generated by the generative AI engine based on the real time data of the communication channel and whether any follow-up notifications (or questions) have already been answered within the real time data and which follow-up notifications (or questions) have yet to be answered. Thus, and based on the unanswered follow-up notification(s) determined by system, the generative AI engine may update the notification interface component with the at least one follow-up notifications. In some such embodiments, the follow-up notifications within the notification interface component may be ranked based on their importance to resolving the issue attribute(s). Additionally, and in some embodiments, new follow-up notifications may be generated as needed and based on real time data of the previous follow-up notifications' answers as they are received, if necessary, and as determined by the generative AI engine. Such new follow-up notifications may additionally be ranked within the original ranking as they are generated by the generative AI engine.

In some embodiments, and as shown in block 506, the process flow 500 may include the step of updating, in an instance where the at least one follow-up notification is not present in the real time data, the notification interface component with the at least one follow-up notification. For example, and in some embodiments, the system may update the notification interface component and re-transmit the updated notification interface component to the user device based on the generated follow-up notifications as they are generated. In this manner, the notification interface component may be automatically and dynamically generated as new data received (e.g., the real time data is received and analyzed by the generative AI engine).

FIG. 6 illustrates a process flow 600 for automatically transmitting the communication channel to an agent user device based on an identification of an agent identifier based on the issue attribute of the communication channel, in accordance with an embodiment of the disclosure. In some embodiments, a system (e.g., similar to one or more of the systems described herein with respect to FIGS. 1A-1C) may perform one or more of the steps of process flow 600. In some embodiments, a generative artificial intelligence engine (e.g., such as the generative AI engine shown in FIG. 2) may perform some or all the steps described in process flow 600.

In some embodiments, and as shown in block 602, the process flow 600 may include the step of accessing, by the generative AI engine, an agent database associated with an entity of the communication channel. For example, and in some embodiments, the system may access—using the generative AI engine—an agent database comprising a plurality of agent data and agent identifiers, such as agent data comprising historical issue attributes that have been resolved, historical communication traits of the agent and/or of users communicated with over communication channels, agent user devices, and/or the like. In such embodiments, the agent database may be associated with a particular entity, whereby the entity may be a client of the system and/or a manager of the system. In this manner, only the database of agents and their data may be accessed by the system based on the entity, rather than a plurality of databases being accessed to determine the proper agent identifier.

In some embodiments, and as shown in block 604, the process flow 600 may include the step of identifying, by the generative AI engine, at least one agent identifier from the agent database based on the at least one issue attribute of the communication channel compared to an agent issue attribute of the at least one agent identifier, wherein the issue attribute and the agent issue attribute match. For example, and in some embodiments, the system may identify—using the generative AI engine—at least one agent identifier that is appropriate or applicable for dealing with the currently identified issue attribute, such as based on historical issue attributes that have been resolved by the agent of the agent identifier, based on communication attributes of the agent of the agent identifier and/or of users that have communicated with the agent of the agent identifier, and/or the like. In this manner, an appropriate agent may be identified by the system for dealing with the current communication channel based on its real time data and based on the agent's historical data.

In some embodiments, and as shown in block 606, the process flow 600 may include the step of automatically transmitting the communication channel, to an agent user device associated with the agent identifier. For instance, and in some embodiments, the system may automatically transmit the communication channel from a current agent of the entity to a user device associated with the agent identifier identified in block 604. In this manner, the system may automatically and efficiently transfer the communication channel on the entity side between agent identifiers of a first communication transmission to an agent user device associated with an appropriate agent for the issue attribute, the user, and/or the like.

In some embodiments, the automatic transmission to the agent user device is based on a real time availability attribute for the agent user device, wherein the real time availability attribute comprises an availability of an agent associated with the agent identifier. For example, the system may automatically transfer the communication channel to an agent user device where the agent user device is available, on, and is not currently in another communication channel (such as with another user or another agent). In some embodiments, and where a first agent that is identified to handle the communication channel in block 604 is unavailable (such as based on their agent user device), then the system may use a secondary agent identifier that has also been identified as a back-up to transfer the communication channel automatically, efficiently, and in near real time.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically generating notifications based on current data transmissions over a remote electronic network, the system comprising:

a processing device;

a non-transitory storage device containing instructions when executed by the processing device, causes the processing device to perform the steps of:

identify a communication channel comprising a user identifier;

train a generative AI engine based on at least one pre-determined guardrail for the communication data in the communication channel, historical user data associated with the user identifier, and at least one historical issue attribute;

collect real time data of the communication channel;

apply the real time data to the trained generative AI engine;

determine, by the generative AI engine, at least one issue attribute based on the real time data in the communication channel;

generate, by the generative AI engine, a dynamic script based on the real time data and the at least one issue attribute, wherein the dynamic script comprises text data that resolves the at least one issue attribute;

generate a notification interface component based on the dynamic script;

collect, from the communication channel, current real time data after the notification interface component has been generated;

determine the current real time data meets or exceeds the at least one pre-determined guardrail;

automatically update, by the generative AI engine, the dynamic script in response to the current real time data meeting or exceeding the at least one pre-determined guardrail;

update, in response to the updated dynamic script, the notification interface component with a follow-up notification comprising the updated dynamic script; and
determine, based on the follow-up notification, the at least one issue attribute is resolved.

2. The system of claim 1, wherein the non-transitory storage device containing instructions when executed by the processing device, causes the processing device to perform the steps of:
transmit the notification interface component to a user device associated with the communication channel and trigger an automatic configuration of the graphical user interface of the user device.

3. The system of claim 2, wherein the user device is an agent user device associated with an agent user identifier.

4. The system of claim 1, wherein the non-transitory storage device containing instructions when executed by the processing device, causes the processing device to perform the steps of:
update the dynamic script using the generative AI engine continuously and based on collected real time data, wherein the collected real time data is based on a trigger for each newly collected real time data.

5. The system of claim 1, wherein the real time data is compared to the at least one guardrail, and wherein the generative AI engine generates the notification interface component comprising a guardrail alert in an instance where the real time data is outside of the at least one guardrail.

6. The system of claim 1, wherein the generative AI engine is further trained with a database comprising a plurality of pre-generated scripts or a dataset of communication trait attributes associated with the user identifier.

7. The system of claim 1, wherein the non-transitory storage device containing instructions when executed by the processing device, causes the processing device to perform the steps of:
identify, by the generative AI engine, at least one follow-up notification based on the at least one issue attribute;
determine, by the generative AI engine, whether at least one follow-up notification is present in the real time data; and
update, in an instance where the at least one follow-up notification is not present in the real time data, the notification interface component with the at least one follow-up notification.

8. The system of claim 1, wherein the non-transitory storage device containing instructions when executed by the processing device, causes the processing device to perform the steps of:
access, by the generative AI engine, an agent database associated with an entity of the communication channel;
identify, by the generative AI engine, at least one agent user identifier from the agent database based on the at least one issue attribute compared to an agent issue attribute associated with of the at least one agent user identifier, wherein the issue attribute and the agent issue attribute match; and
automatically transmit the communication channel to an agent user device associated with the agent user identifier, wherein the agent user device is a user device associated with the agent user identifier.

9. The system of claim 8, wherein the automatic transmission to the agent user device is based on a real time availability attribute for the agent user device, wherein the real time availability attribute comprises an availability of an agent associated with the agent user identifier.

10. A computer program product for dynamically generating notifications based on current data transmissions over a remote electronic network, the computer program product comprising a non-transitory computer-readable medium comprising code causing an apparatus to:
identify a communication channel comprising a user identifier;
train a generative AI engine based on at least one pre-determined guardrail for the communication data in the communication channel, historical user data associated with the user identifier, and at least one historical issue attribute;
collect real time data of the communication channel;
apply the real time data to the trained generative AI engine;
determine, by the generative AI engine, at least one issue attribute based on the real time data in the communication channel;
generate, by the generative AI engine, a dynamic script based on the real time data and the at least one issue attribute, wherein the dynamic script comprises text data that resolves the at least one issue attribute;
generate a notification interface component based on the dynamic script;
collect, from the communication channel, current real time data after the notification interface component has been generated;
determine the current real time data meets or exceeds the at least one pre-determined guardrail;
automatically update, by the generative AI engine, the dynamic script in response to the current real time data meeting or exceeding the at least one pre-determined guardrail;
update, in response to the updated dynamic script, the notification interface component with a follow-up notification comprising the updated dynamic script; and
determine, based on the follow-up notification, the at least one issue attribute is resolved.

11. The computer program product of claim 10, the computer program product further comprising non-transitory computer-readable medium comprising code causing an apparatus to:
transmit the notification interface component to a user device associated with the communication channel and trigger an automatic configuration of the graphical user interface of the user device.

12. The computer program product of claim 11, wherein the user device is associated with an agent user identifier.

13. The computer program product of claim 10, the computer program product further comprising non-transitory computer-readable medium comprising code causing an apparatus to:
updating the dynamic script using the generative AI engine continuously and based on collected real time data, wherein the collected real time data is based on a trigger for each newly collected real time data.

14. The computer program product of claim 10, wherein the real time data is compared to the at least one guardrail, and wherein the generative AI engine generates the notification interface component comprising a guardrail alert in an instance where the real time data is outside of the at least one guardrail.

15. The computer program product of claim 10, wherein the generative AI engine is further trained with a database comprising a plurality of pre-generated scripts or a dataset of communication trait attributes associated with the user identifier.

16. A computer implemented method for dynamically generating notifications based on current data transmissions over a remote electronic network, the computer implemented method comprising:

identifying a communication channel comprising a user identifier;

training a generative AI engine based on at least one pre-determined guardrail for the communication data in the communication channel, historical user data associated with the user identifier, and at least one historical issue attribute;

collecting real time data of the communication channel;

applying the real time data to the trained generative AI engine;

determining, by the generative AI engine, at least one issue attribute based on the real time data in the communication channel;

generating, by the generative AI engine, a dynamic script based on the real time data and the at least one issue attribute, wherein the dynamic script comprises text data that resolves the at least one issue attribute;

generating a notification interface component based on the dynamic script;

collecting, from the communication channel, current real time data after the notification interface component has been generated;

determining the current real time data meets or exceeds the at least one pre-determined guardrail;

automatically updating, by the generative AI engine, the dynamic script in response to the current real time data meeting or exceeding the at least one pre-determined guardrail;

updating, in response to the updated dynamic script, the notification interface component with a follow-up notification comprising the updated dynamic script; and determining, based on the follow-up notification, the at least one issue attribute is resolved.

17. The computer implemented method of claim 16, further comprising:

transmitting the notification interface component to a user device associated with the communication channel and trigger an automatic configuration of the graphical user interface of the user device.

18. The computer implemented method of claim 17, wherein the user device is associated with an agent user identifier.

19. The computer implemented method of claim 16, further comprising:

updating the dynamic script using the generative AI engine continuously and based on collected real time data, wherein the collected real time data is based on a trigger for each newly collected real time data.

20. The computer implemented method of claim 16, wherein the real time data is compared to the at least one guardrail, and wherein the generative AI engine generates the notification interface component comprising a guardrail alert in an instance where the real time data is outside of the at least one guardrail.

* * * * *